United States Patent [19]
Maheshwari

[11] Patent Number: 5,974,508
[45] Date of Patent: Oct. 26, 1999

[54] CACHE MEMORY SYSTEM AND METHOD FOR AUTOMATICALLY LOCKING CACHE ENTRIES TO PREVENT SELECTED MEMORY ITEMS FROM BEING REPLACED

[75] Inventor: Dinesh Maheshwari, Norwood, Mass.

[73] Assignee: Fujitsu Limited, Japan

[21] Appl. No.: 08/947,188

[22] Filed: Oct. 8, 1997

Related U.S. Application Data

[63] Continuation of application No. 08/437,643, May 9, 1995, abandoned, which is a continuation of application No. 07/924,700, Jul. 31, 1992, abandoned.

[51] Int. Cl.⁶ .................................................. G06F 12/12
[52] U.S. Cl. .................... 711/133; 711/144; 711/145; 711/159; 710/200
[58] Field of Search ....................... 711/133, 135, 711/136, 144, 145, 159, 160; 395/726, 733, 737

[56] References Cited

U.S. PATENT DOCUMENTS

| | | | |
|---|---|---|---|
| 4,091,447 | 5/1978 | Dillon et al. | 395/737 |
| 4,513,367 | 4/1985 | Chan et al. | 711/145 |
| 4,589,092 | 5/1986 | Matick | 711/207 |
| 4,977,498 | 12/1990 | Rastegar et al. | 711/128 |
| 5,182,809 | 1/1993 | Begun et al. | 395/726 |
| 5,249,286 | 9/1993 | Alpert et al. | 711/125 |
| 5,276,835 | 1/1994 | Mohan et al. | 711/144 |
| 5,353,425 | 10/1994 | Malamy et al. | 711/144 |
| 5,481,751 | 1/1996 | Alpert et al. | 395/389 |
| 5,487,162 | 1/1996 | Tanaka et al. | 711/145 |

OTHER PUBLICATIONS

SPARClite User's Guide, Fujitsu Microelectronics, Inc., Advanced Products Division, Oct. 1991, 15 pages before pages numbered –1 to –2 and 1–1 to 3–23 (total pages, 119).

The SPARC Architecture Manual, Version 8, SPARC International, Inc., 1992, 24 pages before pages numbered 1–57 (total pages, 77).

SPARC Reference Guide, Fujitsu Limited and Fujitsu Microelectronics, Inc., Advanced Products Division, 1989, § I, pp. 1–15 and § II, pp. 1–48 (total pages, 70).

*Primary Examiner*—Glenn Gossage
*Attorney, Agent, or Firm*—Christie, Parker & Hale, LLP

[57] ABSTRACT

A cache memory system has a plurality of cache entries for storing memory items staged from a memory. The cache memory system locks entries so that memory items stored therein are prevented from being replaced by newly staged memory items. Entries can be locked globally whereby more than one entry is locked. Entries can also be locked locally whereby only selected ones of the entries are locked. The cache memory system can also set or clear a representation in an entry representing that such entry is not to be replaced upon being selectively activated or deactivated by an autolock (automatic lock) signal. The representation is memory-mapped and can be set or cleared directly by an integer unit.

15 Claims, 7 Drawing Sheets

| ASI | ADDRESS | NAME |
|---|---|---|
| 1 | 0 | CACHE/BUS INTERFACE UNIT (BIU) CONTROL REGISTER |
| 1 | 4 | LOCK CONTROL REGISTER |
| 1 | 8 | LOCK CONTROL SAVE REGISTER |
| 1 | C | CACHE STATUS REGISTER |
| 1 | 10 | RESTORE LOCK CONTROL REGISTER |

410 — GLOBAL DATA CACHE LOCK
412 — DATA CACHE ENABLE
414 — GLOBAL INSTRUCTION CACHE LOCK
416 — INSTRUCTION CACHE ENABLE

FIG. 4c

420 — DATA CACHE ENTRY AUTO LOCK
422 — INSTRUCTION CACHE ENTRY AUTO LOCK

CACHE MEMORY SYSTEM AND METHOD FOR AUTOMATICALLY LOCKING CACHE ENTRIES TO PREVENT SELECTED MEMORY ITEMS FROM BEING REPLACED

This application is a continuation of U.S. patent application Ser. No. 08/437,643 filed May 9, 1995, now abandoned, which is a continuation of application Ser. No. 07/924,700 filed Jul. 31, 1992, also now abandoned.

TECHNICAL FIELD OF THE INVENTION

The present invention relates in general to a cache memory system and specifically to replacement of entries in a cache memory.

BACKGROUND OF THE INVENTION

The use of a cache to improve the performance of a computer system is well known in the art. Basically, the cache provides a limited amount of intermediate memory between the central processing unit (CPU) and its external memory, so that the data or instructions that are required by the CPU can first be staged to the cache before it is supplied to the CPU. With the size of the cache large enough to hold a substantive portion of instructions and data required by the CPU in processing a program and with the operating speed of the cache higher than that of the external memory, the time spent by the CPU in waiting for memory access is reduced.

When space is needed in the cache to store a new memory item, for instance, data or instructions, from the external memory, prior art cache memory systems typically use one of several replacement algorithms or schemes used to select an entry to be replaced by the new memory item. The most common of the cache replacement algorithms or schemes is the least recently used (LRU) algorithm. When space is needed in the cache to store a new memory item, the cache memory system chooses a storage location for storing the new memory item. With the LRU algorithm, the cache memory system evicts the oldest (least recently used) memory item. In other words, the new memory item replaces the old memory item because the old memory item has not been accessed by the cache memory system as recently as the other memory items. There is no provision in any of the prior art cache memory systems for locking cache entries and protecting them from replacement.

The ability to lock a cache entry can have many potential advantages. For example, it allows the cache to prevent the replacement of time-critical routines which, although not needed frequently, cannot be afforded to be accessed at the slower operating speed of the external memory.

SUMMARY OF THE INVENTION

The present invention is directed to a single chip central processing unit (CPU) having a cache memory system which comprises a cache having a plurality of cache entries for storing memory items staged from an external memory, means for replacing a memory item stored in one of the cache entries by a new memory item being staged from the external memory, and means for locking one or more of the cache entries from being replaced by the means for replacing. A cache entry auto lock bit enables and disables auto locking of cache entries. When this bit is set, a local "auto lock" mode is entered and all subsequent cache accesses automatically set an entry lock bit for the accessed cache entry.

In another aspect, the present invention is directed to a cache management method which comprises the steps of storing a plurality of memory items in a corresponding number of entries in a cache, staging a memory item from a memory if such memory item is not present in the cache, allocating an entry in the cache for storing the memory item staged, and locking selected ones of the entries in the cache to prevent those entries from being allocated in the allocating step.

DETAILED DESCRIPTION OF THE PREFERRED EMBODIMENT

Figure 1:
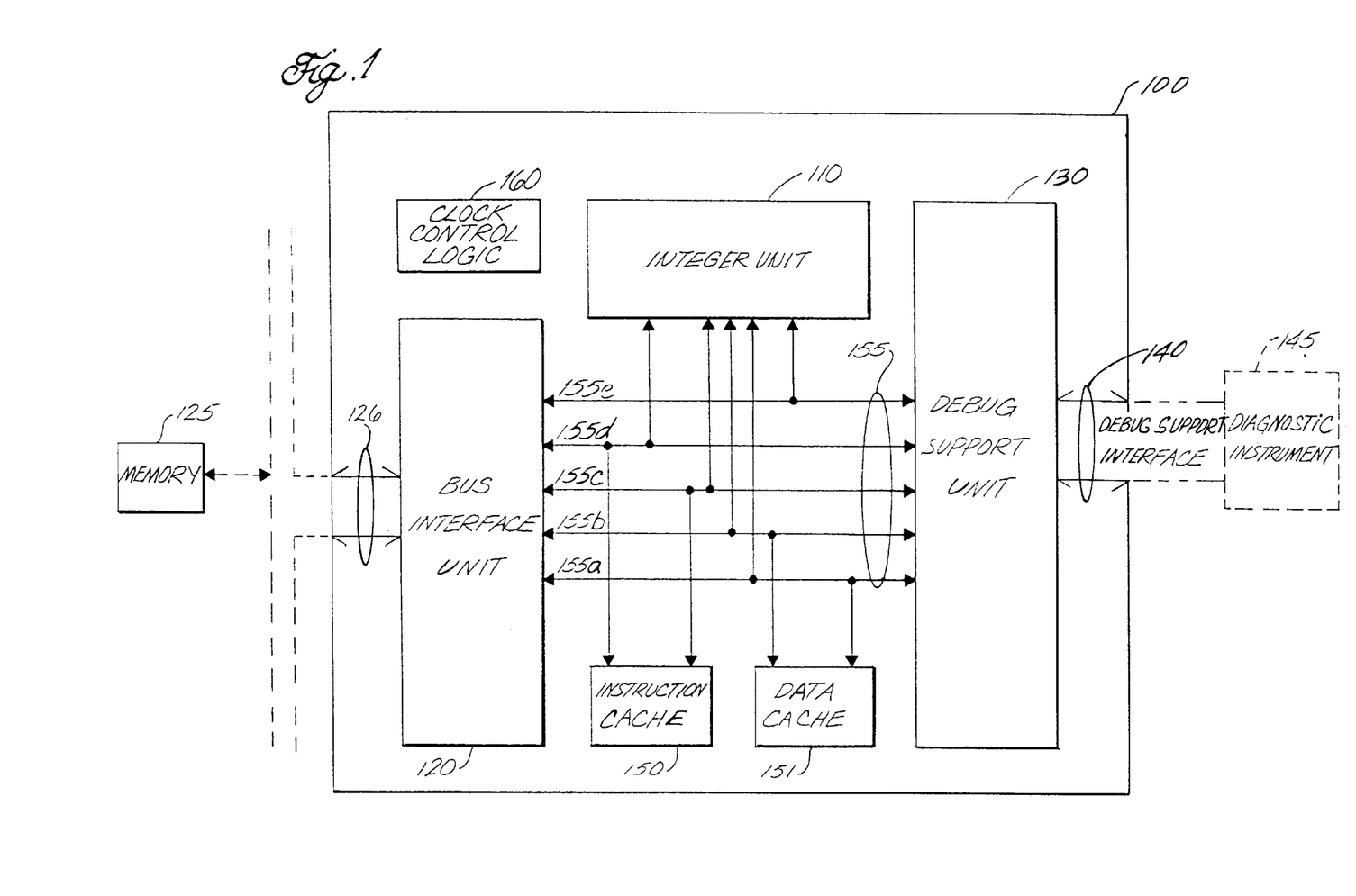
FIG. 1 is a schematic block diagram illustrating a single chip CPU including the cache memory system of the present invention.

FIG. 1 is a schematic block diagram illustrating a single chip central processing unit (CPU) 100 wherein the present invention is embodied. The CPU 100 has an architecture generally described in "The SPARC Architecture Manual," Version 8, SPARC International, Inc., Mountain View, Calif., Jan. 30, 1991, which is incorporated herein by reference. The CPU 100 is a 32-bit wide processing unit. Accordingly, the basic format of its instructions, data and addresses, along with its components such as busses, arithmetic logic unit and registers, are 32 bits wide. However, the width is specifically mentioned herein to facilitate discussion and understanding of the preferred embodiment and is not intended to limit the applicability of the present invention.

Like a conventional computer, CPU 100 fetches instructions and data from an external memory 125. The fetched instructions are processed by an Integer Unit (IU) 110 located within the CPU 100. The term "Integer Unit" is used herein to conform with the terminology set forth by the Scalable Processor Architecture ("SPARC™") and is not intended as a limitation on the applicability of the invention.

The external memory 125 is connected to the CPU 100 via a 32-bit wide conventional bus 126. Bus 126 is commonly referred to as a system bus and is used for connecting the CPU 100 to the external memory 125 and other peripheral devices, such as disks, monitors, keyboard, mouses, etc. (not shown).

The CPU 100 is connected to the system bus 126 through a bus interface unit (BIU) 120. The BIU 120 operates to control and buffer signals passing between the CPU 100 and the external memory 125 or other peripheral devices.

According to the preferred embodiment, CPU 100 can directly address up to one terabyte ($10^{12}$) of memory, organized into 256 address spaces of 4 gigabytes ($10^9$) each. These address spaces may overlap in physical memory, depending on the system design.

In accordance with the "SPARC" architecture, a memory access involves an 8-bit Address Space Identifier (ASI) as well as a 32-bit address. The ASI selects one of the address spaces, and the address selects a 32-bit word within that space. The assignment of the address spaces is listed in Table 1.

TABLE 1

ASI Address Space Assignment

| ASI <7:0> | Address Space |
|---|---|
| 0x1 | Lock Control Register |
| 0x2 | Instruction Cache Lock |
| 0x3 | Data Cache Lock |
| 0x4–0x7 | Application Definable |
| 0x8 | User Instruction Space |
| 0x9 | Supervisor Instruction Space |
| 0xA | User Data Space |
| 0xB | Supervisor Data Space |
| 0xC | Instruction Cache Tag RAM |
| 0xD | Instruction Cache Data RAM |
| 0xE | Data Cache Tag RAM |
| 0xF | Data Cache Data RAM |
| 0x10–0xFE | Application Definable |
| 0xFF | Reserved for Debug Hardware |

To reduce the access time of memory items such as instructions and data from the external memory 125, CPU 100 employs a hierarchical memory architecture, under which the memory items are first staged into either an instruction cache 150 or a data cache 151. These caches 150 and 151 are internal to the CPU chip and are coupled to the BIU 120 and the IU 110 through an internal bus 155.

FIG. 1 also shows clock control logic 160 which supplies clock and other control signals needed for the operation of various components within the computer 100. Description of the clock control logic 160 is deemed unnecessary as it is not needed for the understanding and use of the present invention and because the design of the clock control logic 160 is so dependent on the particular design of a CPU.

The instruction cache 150 and the data cache 151 are accessed independently over the internal bus 155. The instruction cache 150 is read-only, and is accessible one word at a time. The data cache 151 is readable and writable by bytes, half words, words or double words.

Figure 2:
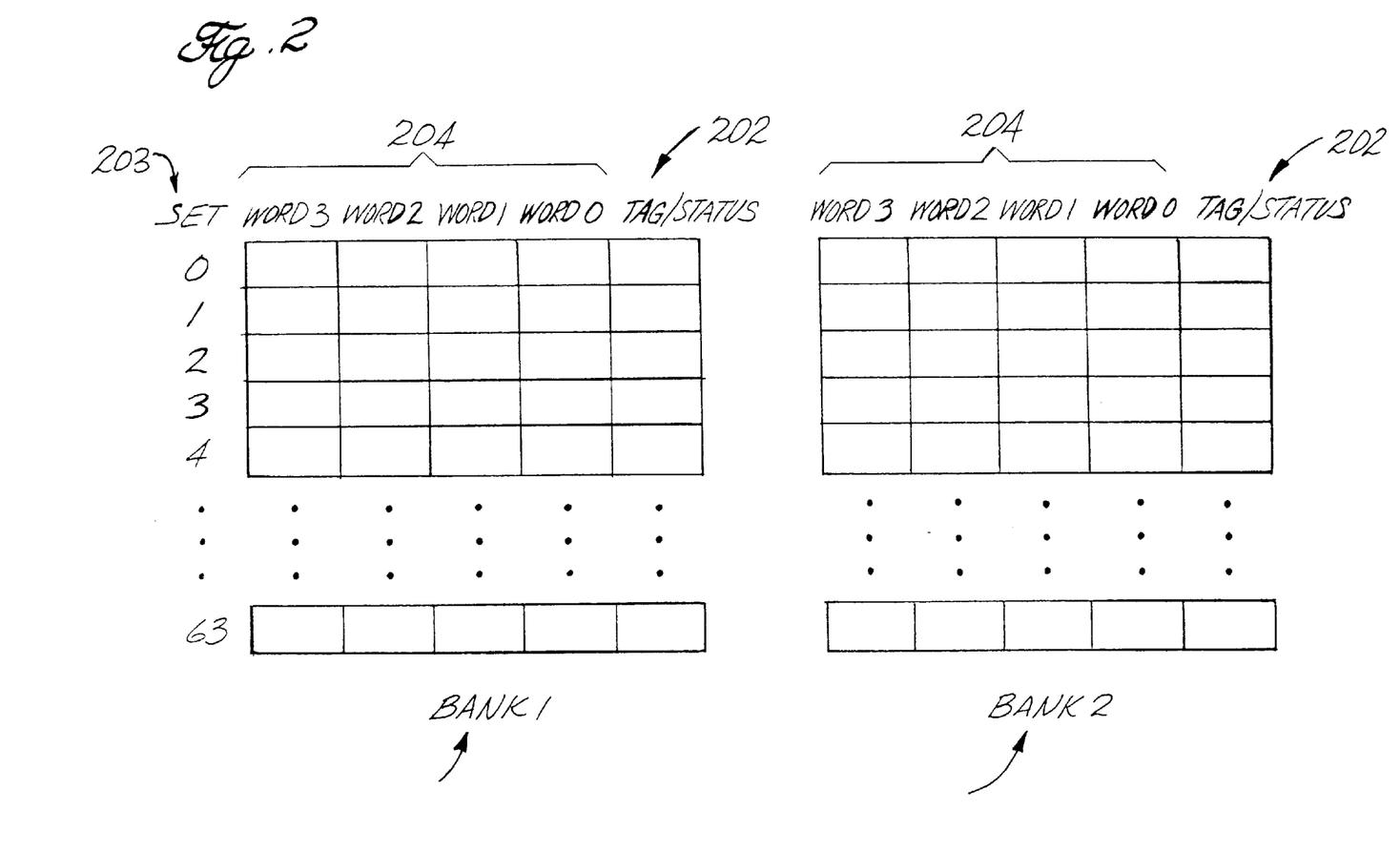
FIG. 2 is a diagram depicting the cache structure of the single chip CPU including the cache memory system.

Each of the instruction cache 150 and the data cache 151 has 2 kilobytes, formed by four random access memory (RAM) arrays. There are two RAM arrays for storing memory items and two RAM arrays for storing cache tags/status. Referring to FIG. 2, each cache is organized into two banks 201a and 201b of sixty-four lines each bank, or a total of one hundred twenty-eight lines. Each line stores four words (204) of memory items. Associated with each cache line is a tag/status field 202 which contains an address tag and other status information. Logic means (not shown) is provided for comparing the address tag with an address issued by the IU 110 (FIG. 1) in accessing a memory item.

The tag arrays and data/instruction arrays in each cache are memory-mapped. Therefore, they can be addressed, read and written directly by instructions as though they were memory locations or registers. According to the preferred embodiment, data cache tags are located in the address space with ASI=0xE and instruction cache tags in the address space with ASI=0xC.

The organization of each cache is a two-way set associative. A pair of corresponding lines from bank 1 (201a) and bank 2 (201b) form a set 203. There are thus 64 sets in a cache. On a cache access, address bits <9:4> are used to select a set 203, and the corresponding memory item can be in either bank 201a or 201b.

The tag/status field 202 of each cache line contains a tag address which indicates the memory location to which the cache line is currently mapped. The tag/status field also contains status information for the cached data or instructions, including a valid bit and a least recently used bit.

According to the present invention, each of the caches 150 and 151 can operate in either a normal mode, a global locking mode or a local locking mode.

In the normal mode, a cache 150 or 151 operates like a conventional cache and supplies memory items to the IU 110 on request. When the IU 110 requests a read operation for a memory item that has not been staged to the cache, the block in the external memory 125 containing the requested item is staged. Staging is performed by the BIU 120, which accesses the item from the external memory 125 and writes it into the cache, over internal bus 155 replacing one of the current cache entries. When an item is staged, IU 110 is notified so that it can continue processing. An entry in the data cache 151 is allocated only when the IU 110 performs a "load" operation. An entry in the instruction cache 150 is allocated when an instruction is fetched. On a "store" operation in normal mode, a write-through policy is used whereby the corresponding location of the memory is directly written.

Each of the caches 150 and 151 can also operate under either a global locking mode or a local locking mode. In a global locking mode, an entire cache is locked. In a local locking mode, only one or more selected entries of the cache are locked. The locking modes allow a user to lock data or instructions in the cache and prevent them from being replaced by newly staged memory items. Because of the set-associative organization, as much as one whole bank 201a or 201b of a cache can be locked while the remaining bank continues to operate normally.

In either locking mode, cache entries may be updated but the corresponding locations of the external memory 125 are not updated. Such a feature enables a locked portion of the data cache to be used as fast on-chip RAM.

Figure 3:
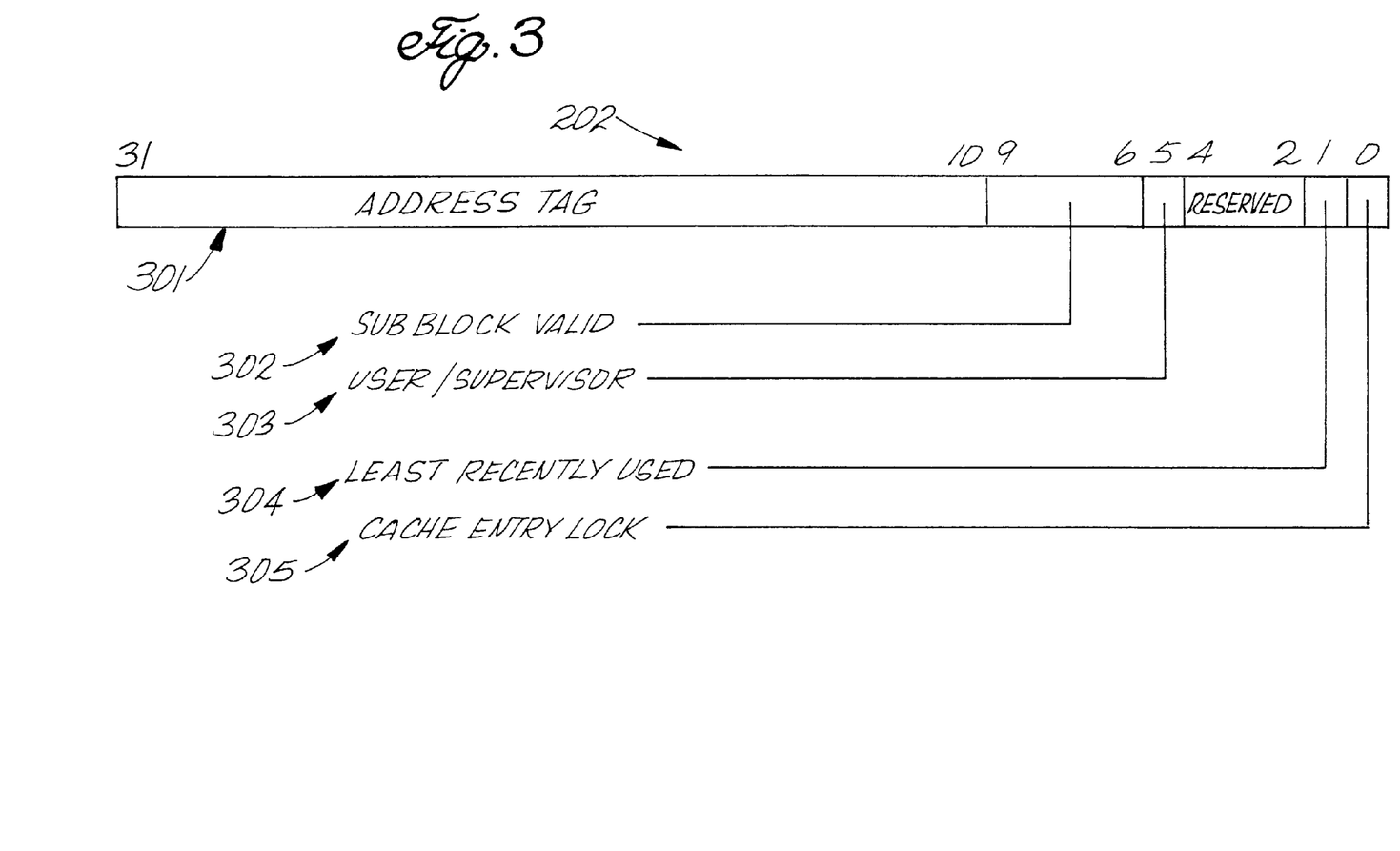
FIG. 3 is a diagram depicting the fields of a cache tag.

FIG. 3 is a diagram showing the contents of the tag/status field 202. The tag/status field 202 of each cache entry includes an address tag field 301 which comprises the most significant 22 bits of the memory address of the memory item stored in that entry. The tag/status field 202 also includes a sub-block valid field 302 which comprises 4 bits, one for each of the 4 words stored in the corresponding line; a valid bit of "1" indicates that the corresponding word of the cache line contains a current memory item for the address indicated by the address tag field 301. The tag/status field 202 also includes a User/Supervisor bit 303 which indicates whether the memory item stored in the corresponding cache line comes from the User Space (User/Supervisor bit="0") or from the Supervisor Space (User/Supervisor bit="1").

The least recently used bit 304 is provided in the tag/status field of one of the banks, e.g., bank 1 (201a), to indicate which bank between the two banks comprising a given set contains the least recently used entry. When this bit is "1", it indicates that the entry in bank 1 was the least recently used entry. Otherwise, the entry in bank 2 was the least recently used entry. If the entries in both banks are valid, the value of this bit determines which of the two entries is to be replaced when a new line needs to be allocated.

The tag/status field 202 also includes a cache "entry lock" bit 305. This bit is used to lock the current cache entry. When entries in both banks 201a and 201b of the cache are locked, an access is treated as noncacheable.

Figure 5:
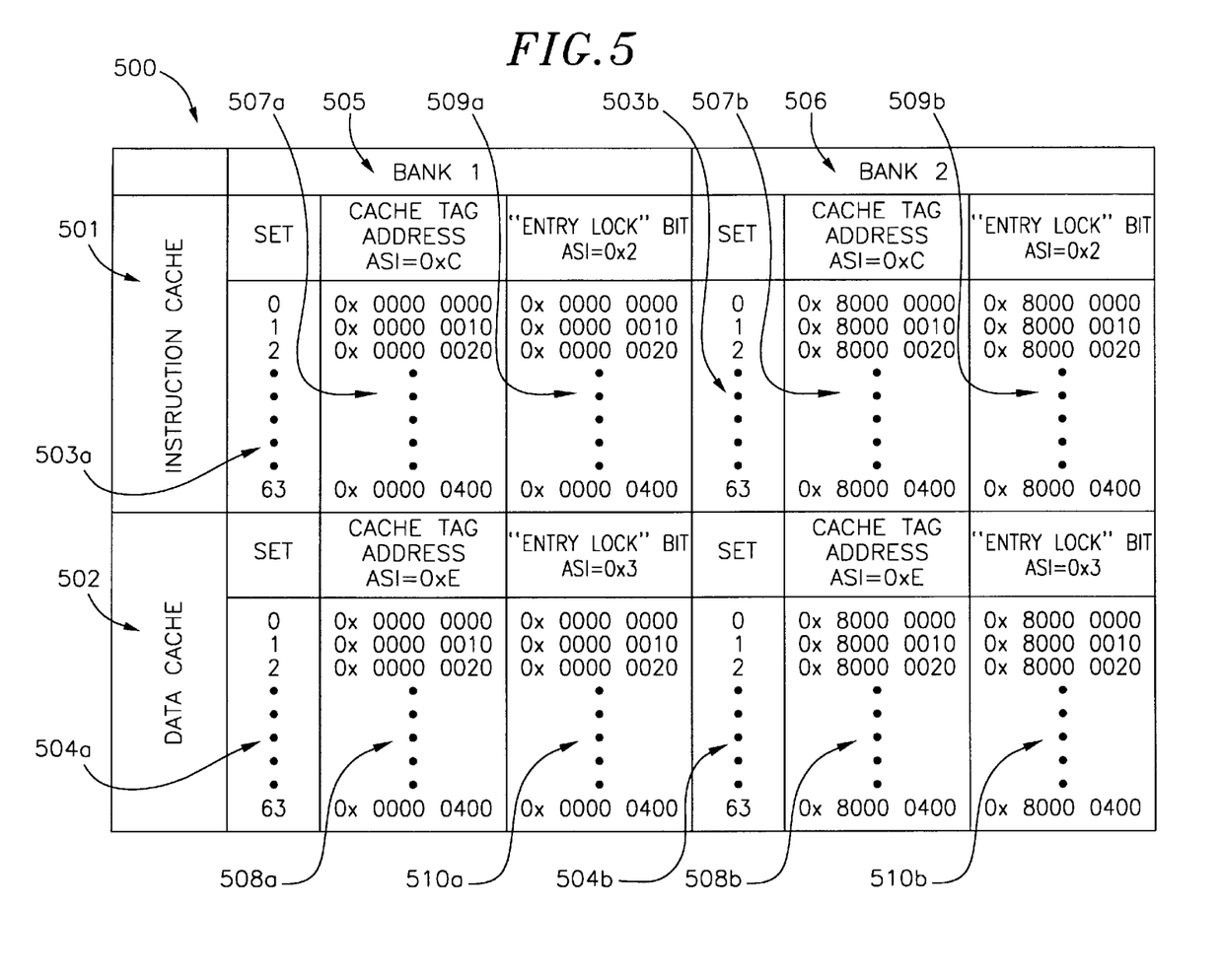
FIG. 5 is a table listing the memory addresses used to directly access the cache tag addresses and the entry lock bits.

As set forth above, the tags are actually formed by a RAM array that is memory-mapped. Each of their fields is thus directly readable and writable. Referring to FIG. 5, a table 500 listing the memory-mapped addresses used for direct access to the cache tag addresses and "entry lock" bits is shown. Table 500 is divided into two sets of memory addresssses for the instruction cache 501 and for the data cache 502. As explained above with reference to FIG. 2, each cache is organized into two banks of 64 lines each. Table 500 represents these two banks as a first set of columns 505 (labeled "Bank 1") and a second set of columns 506 (labeled "Bank 2"). The set of 64 lines for each of the caches is represented as the set of rows 503a and 503b for the instruction cache and rows 504a and 504b for the data cache. A cache tag address can be read by issuing a "read" instruction to the addresses listed in the columns 507a and 507b for the instruction cache and columns 508a and 508b for the data cache. The entry lock bits in the tag/status field 202 can be set and cleared by issuing a "write" instruction to the addresses listed in columns 509a and 509b for the instruction cache and columns 510a and 510b for the data cache. The advantage of directly writing to the entry lock bits in this manner is that only the entry lock bits targeted by the "write" instruction is affected while the rest of the tag/status field 202 is not affected.

Figure 4A:
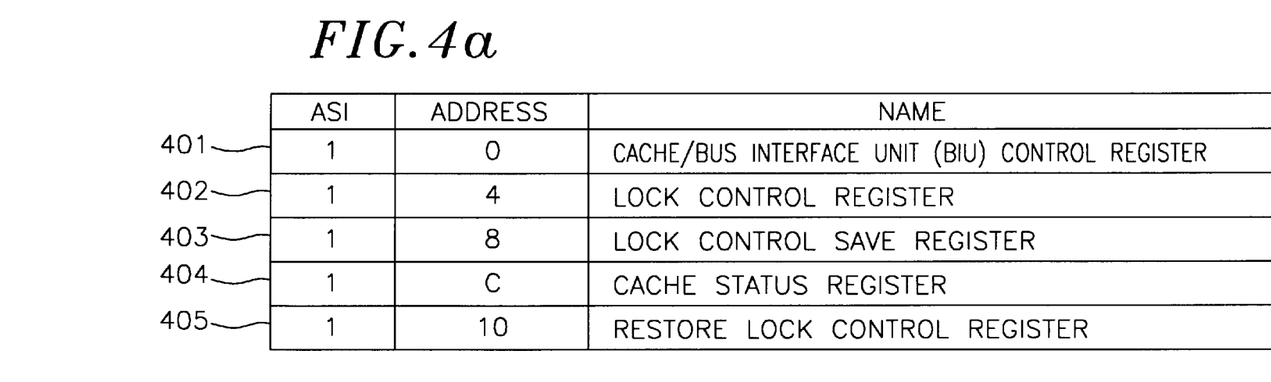
FIG. 4a is a diagram depicting the memory-mapped cache control registers.

In addition to the registers defined by the SPARC architecture, CPU 100 has a collection of memory-mapped registers for controlling operation of the cache including those registers shown in FIG. 4a. These registers can be read and written with the "load" and "store" instructions set to the specified ASI.

Figure 4B:
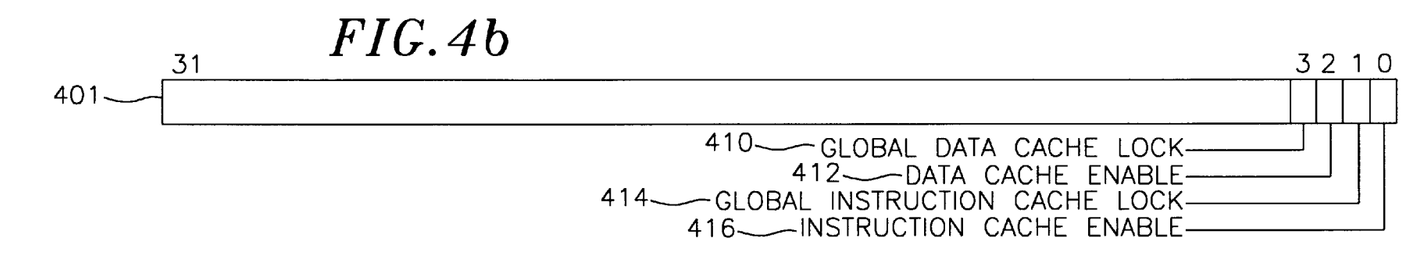
FIG. 4b is a diagram depicting the contents of the cache/bus interface unit (BIU) control register.

Among these registers is a cache/BIU control register 401, shown in FIG. 4b, which contains the following bits:

(1) A global data cache lock bit 410 which locks and unlocks the current entries in the data cache 151. When this bit is set to "1", a valid entry in the data cache 151 will not be replaced by a new memory item being staged from external memory 125. When a hit occurs in a write operation and if the data cache 151 is locked, the data is not written to the external memory 125. Such a feature allows the locked cache to be used as a scratch-pad random access memory or a run-time stack, independent of external memory 125. When the global data cache lock bit 410 is "0", the cache operates normally. At reset, this bit is "0";

(2) A data cache enable bit 412 turns the data cache on and off. At reset, this bit is "0";

(3) A global instruction cache lock bit 414 locks and unlocks the current entries in the instruction cache 150. When this bit is set to "1", a valid entry in the instruction cache 150 will not be replaced by a new memory item being staged from external memory 125. When this bit is "0", the cache operates normally. If CPU 100 uses a pipeline architecture, a "write" operation to this bit will not affect cache operations initiated by the next three successive instructions. At reset, this bit is "0";

(4) An instruction cache enable bit 416 selectively turns the on-chip instruction cache on ("1") and off ("0"). At reset, this bit is "0".

Operation of the cache will now be described.

On reset, both the data cache enable bit 412 and the instruction cache enable bit 416 in cache/BIU control register 401 are set to "0". As a result, the instruction cache 150 and the data cache 151 are turned off and all memory access operations are performed directly to the external memory 125. To use the caches 150 and 151, the valid bits 302, least recently used bits 304, cache entry lock bits 305 should be initialized to "0". After initialization of the caches 150 and 151, the instruction cache enable bit 416 and the data cache enable bit 412 can be set to "1" to turn the caches 150 and 151 on.

Figure 6:
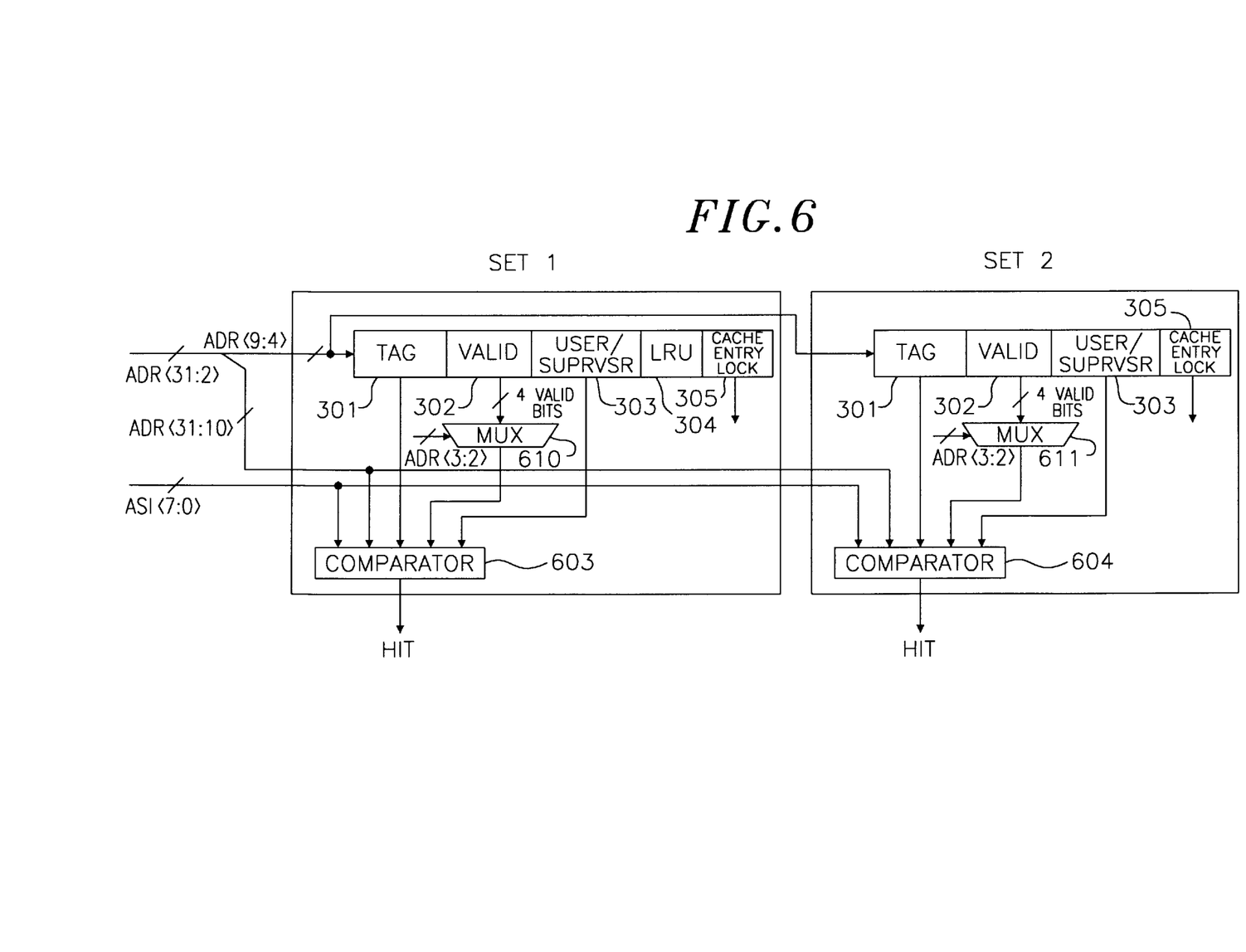
FIG. 6 is a schematic circuit diagram illustrating the means for detecting a cache hit.

Referring to FIG. 6, on a normal cache read or write by IU 110, bits <9:4> of the target address are used to select a set in the appropriate cache. Address bits <3:2> are used by multiplexors 610 or 611 to select a word from each of the two lines in the set. The bits stored in the sub block valid field 302 corresponding to the selected words are checked to see if the corresponding valid bit is set to "1". Recall that sub block valid field 302 is four bits wide with each bit indicating whether one of the four words 204 stored in sets 601 or 602 is valid. Multiplexors 610 and 611 use address bits <3:2> to select the proper bit from sub block valid field 302 and compare that bit to a "1". If the bit selected equals a "1", the corresponding word in the set of four words 204 is also valid. Bits <31:10> of the target address are compared with the address tags. The User/Supervisor bit is tested against the ASI issued by the IU as follows. As indicated in Table 1, an ASI equal to 0×8 (01000) or 0×A (01010) respectively references User Instruction or User Data Space and an ASI equal to 0×9 (01001) or 0×D (01101) respectively references Supervisor Instruction or Supervisor Data Space. The least-significant-bit of the ASI equals "0" when the User Space is being referenced and equals "1" when the Supervisor Space is being referenced. Thus, it can be used to uniquely identify whether User Space or Supervisor Space is being referenced and comparators 603 and 604 compare this least-significant-bit against the User/Supervisor bit.

Comparators 603 and 604 decode <7:0> to determine whether the ASI issued by the IU is a request to user or supervisor memory data space. Comparators 603 and 604 will determine a single bit value representing whether ASI <7:0> references User or Supervisor Data space and compare this single bit value against the User/Supervisor bit from the cache entry.

A cache hit occurs when bits <31:10> of the target address match the address tag bits 301 in either set 601 or 602 of the cache and when the User/Supervisor bit 303 matches the ASI issued by the IU 110 and when the valid bit 302 corresponding to the word being accessed is "1".

In a cache read operation, if a cache hit occurs, the requested memory item is in the cache and it is returned to the IU 110 from the cache. The least recently used bit 304 of the corresponding line is updated.

If a cache miss occurs during a cache read operation, a request is sent by the BIU 120 to external memory 125. Though each cache line is four words long, only one word is fetched and staged from the external memory 125. Assuming neither global nor local locking is in force, the staged word replaces an appropriate word in the cache line.

If a read miss occurs because the valid bit 302 for the requested word is not set, that means a cache line is already allocated for a four-word memory block which contains the requested word. The fetched word simply replaces the appropriate word in the cache line; the valid bit 302 for the word is set to "1". If the cause of the read miss is because the addressed line is not present in the cache, a new cache line needs to be allocated, and the least recently used cache entry in the set 601 or 602 corresponding to the requested address, as determined by the least recently used bit, is replaced. The staged word replaces the appropriate word in the cache line; its valid bit 302 is set to "1", and the valid bits 302 for the other words in the cache line are cleared.

According to the present invention, entire caches or selected entries of the cache can be locked into the cache. Locked entries will not be allocated to other memory addresses. Because of the set-associative organization, one bank of each cache can continue to operate as a fully functional direct-mapped cache, no matter how many entries in the other bank are locked.

On a read miss, if one of the entries in the addressed set is locked, the unlocked one is allocated, whether or not it was the least recently used cache entry. If both entries, or the entire cache, are locked, then the access will be treated as noncacheable.

Figure 7:
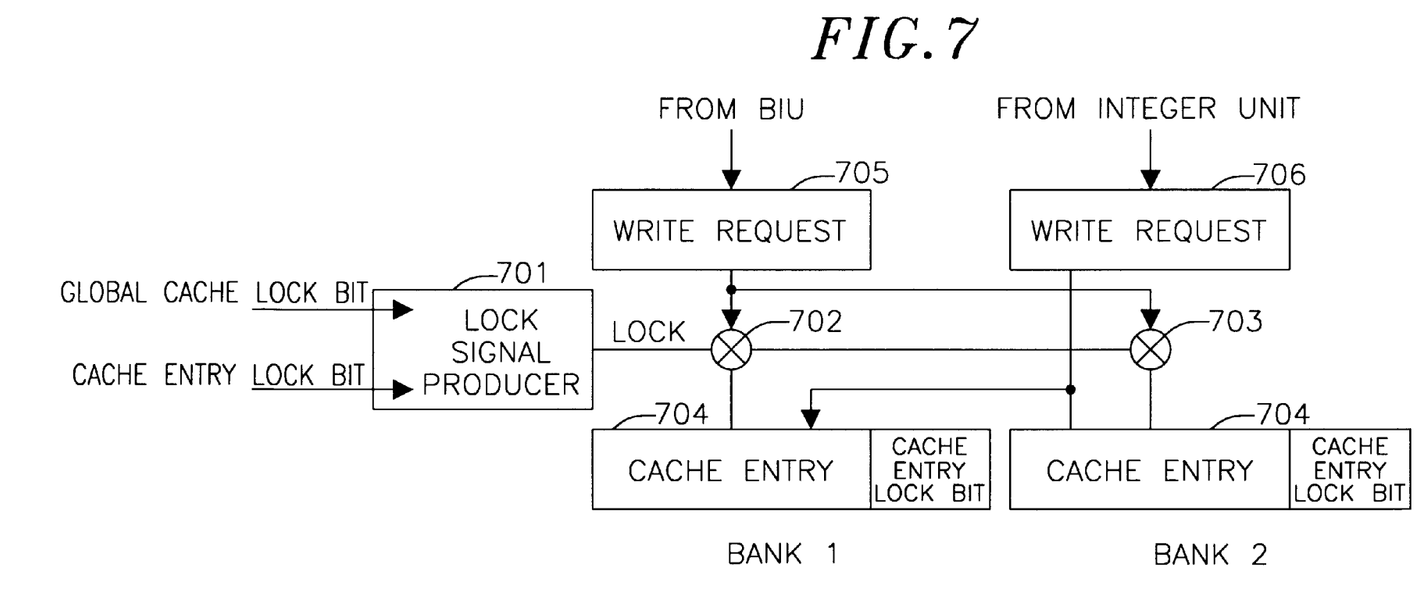
FIG. 7 is a schematic circuit diagram illustrating a cache system with cache entry locking.

The locking of cache entries is illustrated in FIG. 7. Lock signal producer block 701 receives and examines the global lock bit and entry lock bit to produce a lock signal. The lock signal is used to enable and disable the updating or replacement of a cache entry 704 by the BIU 120 during a memory staging operation by controlling switches 702 and 703. If a cache entry 704 is locked, a write request 705 from BIU 120 is prevented from replacing the cache entry 704. On the other hand, since a write request 706 from the IU 110 does not change the address tag 301 of a cache entry, the lock signal does not prevent a write request 706 from IU 110 from updating or replacing the cache entry 704.

CPU 100 has a global locking mode and a local locking mode. The global locking mode is selectably enabled and disabled by setting or resetting the global instruction cache lock bit 414 or the global data cache lock bit 410 in the cache/BIU control register 401 shown in FIG. 4b. The global locking mode affects an entire cache. When a cache is locked globally, valid cache entries are not replaced, but invalid words in allocated cache locations will be updated. Enabling global locking does not affect cache entry lock bits 305 of individual cache lines. When global locking is subsequently disabled cache, lines with inactive cache entry lock bits 305 are once again subject to replacement.

Figure 4C:
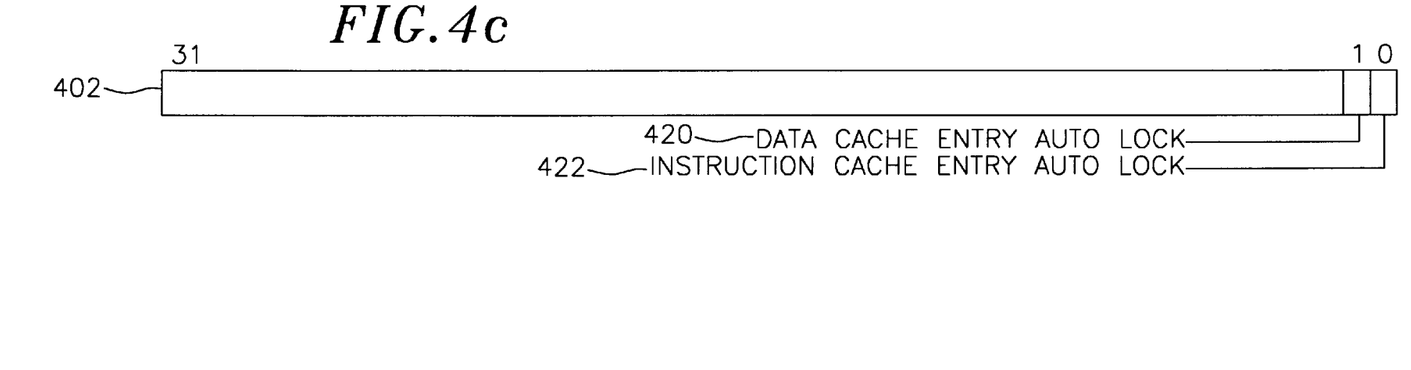
FIG. 4c is a diagram depicting the contents of the lock control register.

CPU 100 also has a local locking mode. The collection of memory-mapped registers for controlling operation of the cache also includes a lock control register 402 shown in FIG. 4c. As set forth above, this register can be read and written with the "load" and "store" instructions set to an ASI equal to 0×1. The local locking mode is enabled or disabled by setting or resetting the following two bits of the lock control register 402:

(1) A data cache entry auto-lock bit 420 enables ("1") and disables ("0") auto-locking for entries in the data cache 151. All data accessed while this bit is set to "1" have the lock bits in the cache tags of the corresponding entries set to "1". Writes to this bit affect all subsequent data accesses. At reset, this bit is "0".

(2) An instruction cache entry auto-lock bit 422 enables ("1") and disables ("0") auto-locking for entries in the instruction cache 150. All instructions fetched while this bit is set to "1" have the lock bits in the cache tags of the corresponding entries set to "1". Writes to this bit do not affect cache operation for the following three instructions. At reset, this bit is "0".

When either the cache entry auto-lock bit 420 or instruction cache entry auto lock bit 422 are set, local "auto-lock" modes are entered for the data cache 151 or the instruction cache 150, respectively. Under the local auto lock mode, all subsequent cache accesses automatically set the cache entry lock bit 305 of the accessed cache entry. That is, when a cache entry is accessed under auto lock mode, the cache entry lock bit 305 for that cache is turned on in the same manner as the least recently used bit 304.

Typically, the cache entry auto lock bit 420 or 422 in the lock control register 402 is set immediately before a routine is executed. When the routine is executed, data and instructions are staged to the cache. As each memory item is put into a cache entry, the corresponding cache entry lock bit 305 is set, thereby locking the entry. Software can also lock and unlock an individual entry by directly writing to the cache entry lock bit 305 in that entry's tag.

A cache entry auto lock bit 420 or 422 in the lock control register 402 is cleared in one of two ways. Normally, software clears the cache entry auto lock bit at the end of the routine being locked. If a trap or interrupt occurs, the cache entry auto lock bit will be cleared by hardware. This disables the locking mechanism so that the service routine is not locked into the cache by mistake.

When an external interrupt or hardware trap occurs, the auto-locking of cache entries in the on-chip cache is disabled. The lock control save register 403 is used to reenable auto locking after the interrupt has been serviced. The content of the lock control register 402 before the interrupt or trap is automatically saved in the lock control save register 403 so that it can be restored on a return from the trap.

For the auto lock feature to be advantageously used, critical loops in the routine should fit entirely in the cache. They can then be locked in the cache to prevent their being replaced when other, less-often-used routines are called. In some cases, it may be advisable to disable compiler inline optimization to keep the code compact. Some compilers will expand the size of the object code when performing inline optimization because the compiler substitutes subroutine calls with the actual subroutine code. Disabling inline optimization prevents code expansion and will keep the object code small enough to fit into the limited confines of the cache.

The auto-lock feature can also be advantageously exploited by partitioning a large program or data set in such a way that one portion at a time can be locked into the cache and used before another portion needs to be loaded. For example, some numerical routines perform as many of their required computations as possible on one block of data before proceeding to the next block.

A description of a particular embodiment as given above is for an understanding of the present invention. It will be understood by those skilled in the art that various modifications and additions can be made without substantially departing from the scope of this invention, which is defined by the following claims.

What is claimed is:

1. A single chip central processing unit (CPU) having an integer unit for generating read and write requests to an external memory, a cache memory internal to the single chip CPU for storing memory items staged from the external memory and a bus interface unit for reading and writing memory items stored in the external memory and for replacing memory items stored in the cache memory, wherein the integer unit, cache memory and bus interface unit are interconnected by a bus, the cache memory having a plurality of cache entries for storing memory items and corresponding cache entry lock bits, the single chip CPU comprising:

a memory-mapped cache/bus interface unit (BIU) control register connected to the integer unit and having a global cache lock bit selectively settable by the integer unit for indicating that all cache entries are to be locked;

a memory-mapped lock control register connected to the integer unit and having a cache entry auto lock bit selectively settable by the integer unit for indicating that individual cache entries are to be locked when accessed by the bus interface unit; and means connected to the cache memory, the cache/BIU control register and the lock control register, for locking all cache entries by selectively disabling replacement of all memory items stored therein by the bus interface unit while the global cache lock bit in the memory-mapped cache/BIU control register is set, and for automatically locking individual cache entries by setting the corresponding cache entry lock bits in the individual cache entries, thereby selectively disabling replacement of individual memory items stored therein, when he individual cache entries are subsequently accessed by the bus interface unit while the cache entry auto lock bit in the memory-mapped lock control register is set.

2. A single chip CPU as in claim 1 wherein each cache entry further comprises a plurality of valid bits for representing that each memory item contained therein corresponds to a memory item stored in the external memory, one of the valid bits being set when a corresponding memory item in the cache memory is replaced.

3. A single chip CPU as in claim 1 wherein the cache memory further comprises a plurality of least recently used bits, each least recently used bit representing that a corresponding cache entry that was least recently used will be the first to be replaced, each least recently used bit corresponding to one of the cache entries, one of the least recently used bits being set when a corresponding memory item in the cache memory is replaced.

4. In a computer system having a central processing unit and an external memory, the central processing unit having an integer unit for generating read and write requests and at least one cache memory system internal to the central processing unit for storing memory items staged from the external memory, each cache memory system comprising:

a memory-mapped cache/bus interface unit (BIU) control register having a global cache lock bit selectively settable by the integer unit;

a memory-mapped lock control register having a cache entry auto lock bit selectively settable by the integer unit;

a cache having a plurality of cache entries for storing the memory items staged from the external memory and corresponding cache entry lock bits;

a bus interface unit coupled to the integer unit and the cache by a first bus and coupled to the external memory by a second bus for replacing a memory item stored in the external memory in response to a write request and for replacing a memory item stored in one of the cache entries with a new memory item from the external memory in response to a read request; and locking means coupled to the cache, the memory-mapped cache/BIU control register and the memory-mapped lock control register, for locking all cache entries by selectively disabling replacement of all memory items stored therein by the bus interface unit while the global lock bit in the memory-mapped cache/BIU control register is set, and for automatically locking individual cache entries by setting the corresponding cache entry lock bits in the individual cache entries, thereby selectively disabling replacement of individual memory items stored therein, when the individual cache entries are subsequently accessed by the bus interface unit while the cache entry auto lock bit is set in the lock control register.

5. A computer system as in claim 4, wherein each cache entry further includes a plurality of valid bits for representing that each memory item contained therein corresponds to a memory item in the external memory, whereby if a cache entry is already allocated for a new memory item, the bus interface unit sets the valid bit corresponding thereto, otherwise the bus interface unit allocates a new cache entry, sets the valid bit corresponding the new memory item and clears all other valid bits in the new cache entry.

6. A computer system as in claim 4 further comprising:

a lock control save register located in the central processing unit for saving the contents of the memory-mapped lock control register in response to an external interrupt or a hardware trap and for restoring those contents upon termination of the external interrupt or the hardware trap.

7. A computer system as in claim 4 wherein each cache entry further comprises:

a least recently used bit for representing that the cache entries that were least recently used will be the first to be replaced, whereby the locking means sets the least recently used bit on a cache hit or whenever the bus interface unit replaces a memory item stored in a cache entry.

8. A computer system as in claim 7 wherein the cache is two-way set associative.

9. A computer system as in claim 8 wherein the cache is an instruction cache which is read-only.

10. A computer system as in claim 8 wherein the cache is a data cache which is readable and writable.

11. A method for managing a cache internal to a single chip central processing unit, comprising the steps of:

storing a plurality of memory items in a plurality of cache entries in the cache, each cache entry including a corresponding cache entry lock bit;

staging a new memory item from the external memory in response to a read request that results in a cache miss;

replacing a memory item stored in one of the cache entries with the new memory item;

setting a global lock bit in a cache/bus interface unit (BIU) control register when replacement of memory items in all cache entries is to be blocked;

preventing replacement of memory items in all cache entries in the replacing step, while the global lock bit is set in the cache/bus interface unit (BIU) control register;

setting an auto lock bit in a lock control register when replacement of memory items in individual cache entries is to be blocked; and locking individual cache entries by preventing replacement of memory items in the individual cache entries in the replacing step, by setting the corresponding cache entry lock bits of the individual cache entries, when the individual cache entries are accessed by a bus interface unit while the auto lock bit is set in the lock control register.

12. A method as in claim 11, further comprising the step of:

setting a cache entry lock bit for an individual cache entry using the single chip central processing unit to write directly to that cache entry lock bit.

13. A method as in claim 11 further comprising the steps of:

saving the contents of the lock control register in response to an external interrupt or a hardware trap; and restoring those contents upon termination of the external interrupt or the hardware trap.

14. A method as in claim 11, wherein the cache comprises two banks, and said method further comprises:

locking one bank in response to the global lock bit being set in the cache/BIU control register; and accessing the other bank while the global lock bit is set and the one bank is locked.

15. A method as in claim 11, wherein each cache entry further includes a plurality of valid bits for representing that each memory item contained therein corresponds to a memory item stored in an external memory, said method further comprising the step of:

setting one of the plurality of valid bits corresponding to a new memory item if a cache entry is already allocated and clearing all other valid bits in a new cache entry if a new cache entry must be allocated for the new memory item.

* * * * *